US012384531B2

(12) United States Patent
Simonneaux et al.

(10) Patent No.: US 12,384,531 B2
(45) Date of Patent: *Aug. 12, 2025

(54) LANDING GEAR STORAGE AND QUICK SERVICING SOLUTION

(71) Applicant: Safran Landing Systems UK LTD, Gloucester (GB)

(72) Inventors: Yann Simonneaux, Gloucester (GB); Jon Smith, Gloucester (GB)

(73) Assignee: Safran Landing Systems UK Limited (GB)

( * ) Notice: Subject to any disclaimer, the term of this patent is extended or adjusted under 35 U.S.C. 154(b) by 230 days.

This patent is subject to a terminal disclaimer.

(21) Appl. No.: 17/939,069

(22) Filed: Sep. 7, 2022

(65) Prior Publication Data
US 2023/0002038 A1 Jan. 5, 2023

Related U.S. Application Data

(62) Division of application No. 15/608,544, filed on May 30, 2017, now Pat. No. 11,479,347.

(30) Foreign Application Priority Data

Jun. 1, 2016 (EP) ..................................... 16172398

(51) Int. Cl.
*B64C 25/62* (2006.01)
*B64C 25/60* (2006.01)
(Continued)

(52) U.S. Cl.
CPC .............. *B64C 25/62* (2013.01); *B64C 25/60* (2013.01); *B64F 5/60* (2017.01); *F16F 9/0245* (2013.01);
(Continued)

(58) Field of Classification Search
CPC ........... G01G 19/07; B64F 5/60; B64C 25/60; B64C 25/58
See application file for complete search history.

(56) References Cited

U.S. PATENT DOCUMENTS 2,443,045 A 6/1948 Magruder et al.
3,581,836 A 6/1971 Segerdahl et al.
(Continued)

FOREIGN PATENT DOCUMENTS

EP 2957501 A1 12/2015

OTHER PUBLICATIONS

Dallas, C.H., "Shock Strut Servicing" Service News—A Service Publication of Lockheed-Georgia Company, A Division of Lockheed Corporation, vol. 7, No. 3, Jul.-Sep. 1980, retrieved from Internet: http://www.lockheedmartin.com/content/dam/lockheed/data/aero/documents/global-sustainment/product-support/Service-News/V7N3.pdf, 20 pages.

(Continued)

*Primary Examiner* — Christopher D Hutchens
(74) *Attorney, Agent, or Firm* — Buchanan Ingersoll & Rooney

(57) ABSTRACT

A method for pressurizing and depressurizing a shock absorber of an aircraft. More specifically, it relates to a method in which an aircraft weight and ambient temperature are used to calculate a required pressurization level of a shock absorber. As such, the shock absorber may be pressurized to the correct level without applying an iterative approach, greatly reducing initialization time.

12 Claims, 2 Drawing Sheets

(51) Int. Cl.
  *B64F 5/60* (2017.01)
  *F16F 9/02* (2006.01)
  *G01D 5/22* (2006.01)
  *G05B 19/04* (2006.01)
  *G01G 19/07* (2006.01)

(52) U.S. Cl.
  CPC ........... *G01D 5/2291* (2013.01); *G05B 19/04* (2013.01); *G01G 19/07* (2013.01)

(56) References Cited

U.S. PATENT DOCUMENTS

| | | | |
|---|---|---|---|
| 4,007,894 A * | 2/1977 | Hartel | B64C 25/60 244/104 FP |
| 5,521,827 A | 5/1996 | Lindberg et al. | |
| 5,548,517 A | 8/1996 | Nance | |
| 6,032,090 A | 2/2000 | von Bose | |
| 6,128,951 A | 10/2000 | Nance | |
| 8,340,892 B2 | 12/2012 | Long et al. | |
| 11,479,347 B2 * | 10/2022 | Simonneaux | G01D 5/2291 |
| 2006/0220917 A1 * | 10/2006 | Nance | B64C 25/00 340/960 |
| 2007/0012106 A1 | 1/2007 | Mardirossian | |
| 2015/0367933 A1 | 12/2015 | Li et al. | |
| 2016/0101877 A1 | 4/2016 | Shepard et al. | |
| 2017/0166330 A1 | 6/2017 | Fazeli et al. | |
| 2018/0216988 A1 | 8/2018 | Nance | |
| 2019/0049287 A1 | 2/2019 | Nance | |
| 2022/0127016 A1 * | 4/2022 | Schmidt | G01M 17/04 |

OTHER PUBLICATIONS

European Search Report for European Application No. EP16172398.6, dated Dec. 5, 2016, 10 pages.

Entire patent prosecution history of U.S. Appl. No. 15/608,544, filed May 30, 2017, entitled, "Landing Gear Storage and Quick Servicing Solution."

* cited by examiner

LANDING GEAR STORAGE AND QUICK SERVICING SOLUTION

This application is a divisional of U.S. application Ser. No. 15/608,544, filed on May 30, 2017, which claims the benefit of and priority to European Application EP16172398, filed on Jun. 1, 2016, the contents of both of which are incorporated herein by reference.

FIELD OF THE INVENTION

The present invention relates to a method of pressurizing a shock absorber for an aircraft. More specifically, the present invention describes a method in which the weight of the aircraft is known or can be calculated, and the ambient temperature around the aircraft can be measured. In such a case, the pressurization requirement for the shock absorber can be calculated and the shock absorber can be pressurized correctly without the need for maintenance personnel using a pressurization chart and a measuring tool to iteratively pressurize the landing gear.

BACKGROUND OF THE INVENTION

The invention relates to the landing gear of an aircraft and the storage of an aircraft for long or short periods. During transportation or storage, the shock absorbers of an aircraft are pressurized to a specific storage pressure, typically low, to keep the seals energized but not high enough to generate significant loads in the structure, which would result in leakage. In this condition the shock absorber will be fully compressed. Prior to use of the aircraft, the shock absorber must be fully pressurized.

The landing gear must be pressurized to achieve a particular shock absorber extension length, specific to the type of aircraft. This pressurization level is calculated using the weight of the aircraft, the ambient temperature around the aircraft and static design spring curves.

Due to the widely varying weights of aircraft, the specific weight of any given aircraft is generally unknown. As such the storage pressure of the landing gear and the ambient temperature must be measured to define the correct shock absorber extension. However, for an aircraft in a condition for storage or transportation, where the shock absorber is fully compressed and set to a storage pressure, it is not possible to determine the required extension without pressurizing the shock absorber until the pressure stabilizes, giving an indication of the aircraft weight.

Most shock absorber pressurization techniques generally implement an iterative process of pressurization. In this manner, an engineer will initially pressurize the shock absorber until roughly the right length is achieved. The shock absorber will then be further pressurized or depressurized, and the length of the shock absorber measured repeatedly, until the shock absorber is at the desired length. This process can be a timely one, as the engineer will be required to adjust the pressurization level of the shock absorber by increasingly smaller increments, in order to achieve the required shock absorber length. This process must be repeated for each landing gear on an aircraft.

The present invention aims to overcome the above issue by implementing a method of shock absorber pressurization in which the weight of an aircraft is known or can be easily calculated. In such a case, the pressurization requirement of a shock absorber can be automatically calculated and, as such, the shock absorber can be pressurized to the correct length without the implementation of an iterative process. The method can be implemented simultaneously between all the landing gears on the aircraft.

SUMMARY OF THE INVENTION

One embodiment of the present invention relates to a method of pressurizing or depressurizing the shock absorber of an aircraft of a known weight. The method comprises the steps of measuring an ambient temperature around the shock absorber; calculating a target length of the shock absorber based on the ambient temperature and the weight of the aircraft; and pressurizing the shock absorber to the target length.

The target length of the shock absorber may be a maintenance length, a flight length or a storage length.

The length of the shock absorber may be measured using a Rotary Variable Differential Transformer (RVDT).

The method may be performed on at least two shock absorbers simultaneously.

In another embodiment, a system for pressurizing or depressurizing a shock absorber of an aircraft of a known weight comprises: a least one shock absorber; pressurization means, in fluid connection with the at least one shock absorber; a temperature sensor, arranged to measure an ambient temperature around the system; and control logic, arranged to control the pressurization means, wherein the control logic comprises a processor arranged to: receive an ambient temperature measurement from the temperature sensor; calculate a target shock absorber length based on the temperature measurement and the weight of the aircraft; and instruct the pressurization means to pressurize the shock absorber to the target length.

The system may also comprise a Rotary Variable Differential Transducer arranged to determine the length of the shock absorber.

In another embodiment of the present invention a method of pressurizing or depressurizing an aircraft shock absorber comprises: determining the weight of the aircraft; measuring an ambient temperature around the shock absorber; calculating a target length of the shock absorber based on the ambient temperature and the determined weight of the aircraft; and pressurizing or depressurizing the shock absorber to the target length.

The step of determining the weight of the aircraft may comprise increasing the internal pressure of the shock absorber until the shock absorber begins to extend in length and then measuring the internal pressure of the shock absorber.

The target length of the shock absorber may be a maintenance length, a flight length or a storage length.

The length of the shock absorber may be measured using a Rotary Variable Differential Transformer (RVDT).

In another embodiment, a system for pressurizing or depressurizing a shock absorber of an aircraft comprises: at least on shock absorber; pressurization means, in fluid connection with the at least one shock absorber; a temperature sensor, arranged to measure an ambient temperature around the system; and control logic, arranged to control the pressurization means, wherein the control logic comprises a processor arranged to: determine the weight of the aircraft; receive an ambient temperature measurement from the temperature sensor; calculate a target shock absorber length based on the temperature measurement and the determined weight of the aircraft; and instruct the pressurization means to pressurize the shock absorber to the target length.

The determination of the weight of the aircraft may comprise the processor being further configured to: instruct the pressurization means to increase the internal pressure of the shock absorber until the shock absorber begins to extend in length; and measure the internal pressure of the shock absorber.

The advantages of these embodiments relate to the speed in which the shock absorbers of an aircraft can be pressurized. Calculating the required length for the shock absorber prior to pressurization allows for the removal of the iterative process of pressurization, thus reducing the time it takes to achieve the correct pressurization level in the shock absorber. This is an advantage for a stored unmanned aircraft that needs to be deployed in an emergency.

Another advantage is that each of the shock absorbers of an aircraft can be pressurized simultaneously, instead of one by one. Further, the weight of an aircraft can be monitored by measuring the shock absorber length and ambient temperature.

Further, the automated process of pressurizing or depressurizing the shock absorbers means that the process can be initiated from the cockpit by a pilot, on the runway by a maintenance personnel or from a remote location like a station.

Another advantage is the capability to raise the aircraft to a maintenance height in order to improve access for maintenance tasks or loading equipment under the aircraft in a timely manner.

Finally, spring curves used to calculate the required shock absorber length based on ambient temperature may contain more data points or be directly calculated by a control logic, providing increased precision over conventional spring curves, which are usually accurate to within 20° C.

Described herein is a method of pressurising or depressurising an aircraft shock absorber, the method comprising: determining the weight of the aircraft; measuring an ambient temperature around the shock absorber; calculating a target length of the shock absorber based on the ambient temperature and the determined weight of the aircraft; and pressurising or depressurising the shock absorber to the target length; wherein the step of determining the weight of the aircraft comprises decreasing the internal pressure of the shock absorber from a fully extended length of the shock absorber until the shock absorber begins to contract in length and measuring the internal pressure of the shock absorber when the shock absorber begins to contract.

Also described is a system for pressurising or depressurising a shock absorber of an aircraft, the system comprising: pressurisation means, in fluid connection with the shock absorber; a temperature sensor, arranged to measure an ambient temperature around the system; and control logic, arranged to control the pressurisation means, wherein the control logic comprises a processor arranged to: determine the weight of the aircraft; receive an ambient temperature measurement from the temperature sensor; calculate a target shock absorber length based on the temperature measurement and the determined weight of the aircraft; and instruct the pressurisation means to pressurise or depressurised the shock absorber to the target length; wherein the processor is configured to determine the weight of the aircraft by: instructing the pressurisation means to decrease the internal pressure of the shock absorber until the shock absorber begins to contract in length; and measuring the internal pressure of the shock absorber, wherein decreasing the internal pressure comprises decreasing the internal pressure from a fully extended length of the shock absorber.

BRIEF DESCRIPTION OF THE DRAWINGS

Other advantages and benefits of the present invention will become apparent from a consideration of the following description and accompanying drawings, in which.

DETAILED DESCRIPTION OF EXEMPLARY EMBODIMENTS

Figure 1:
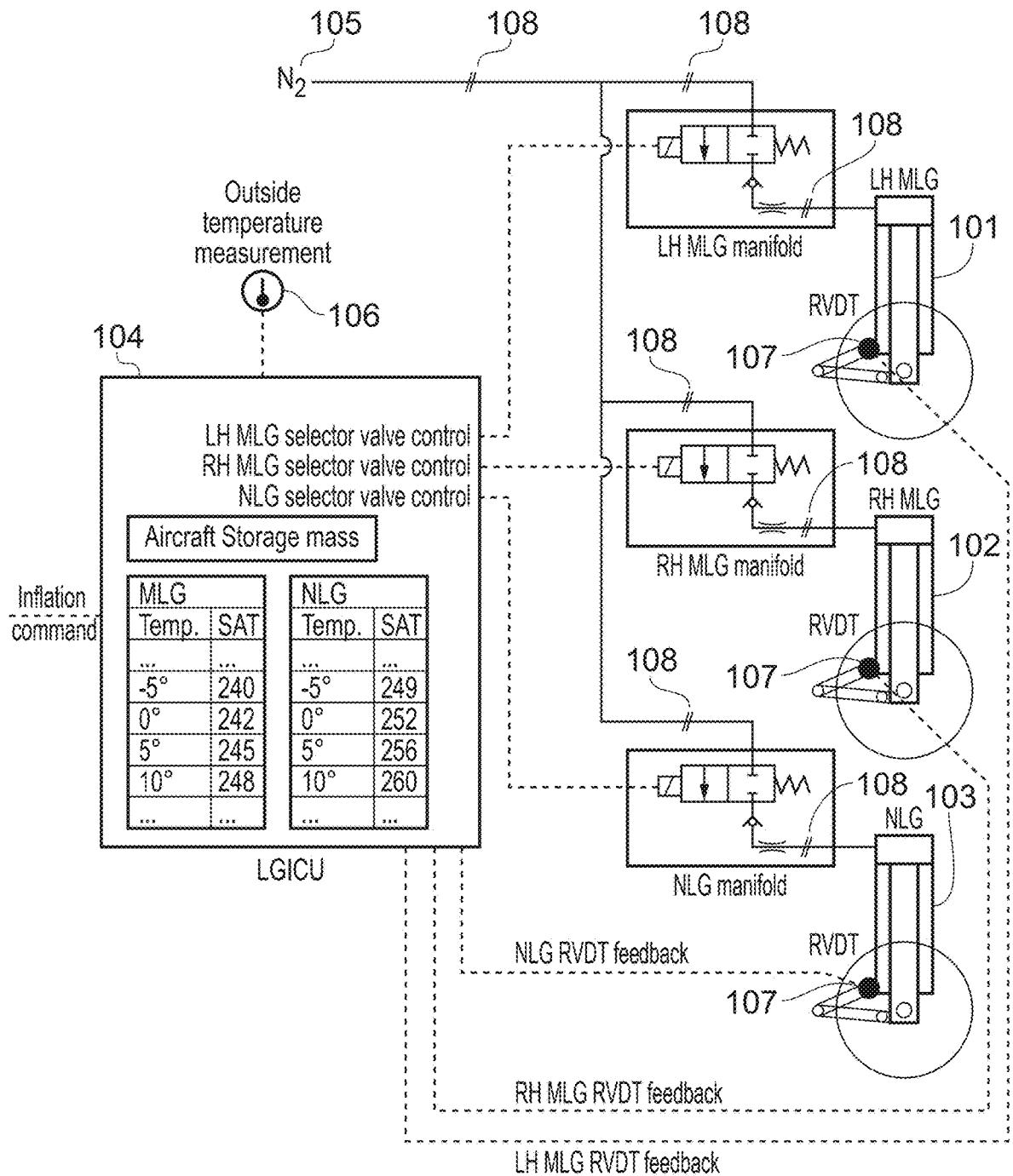
FIG. 1 shows an example of a Landing Gear Inflation Control Unit (LGICU) system architecture.

A method of pressurizing the shock absorber of an aircraft in accordance with an exemplary embodiment of the present invention is shown in FIG. 1.

An aircraft is stored with its landing gears 101, 102, 103 pressurized to a known low storage pressure in which the shock absorbers are fully compressed. Pressurizing the shock absorber from this point increases the pressure without extending the shock absorber. The point at which the pressure is at equilibrium with the weight of the aircraft, the shock absorber will begin to extend. In this manner the weight of the aircraft can be calculated, using the equilibrium pressure, if it is not already known. Upon receiving an pressurization command, a Landing Gear Inflation Control Unit (LGICU) 104 reads the outside temperature which, in conjunction with the aircraft weight, corresponds to a specific shock absorber length requirement for each landing gear.

The system comprises a control unit (the LGICU) 104, at least one landing gear 101, 102, 103 and a high pressure gas supply 105 (for example, Nitrogen).

As shown in FIG. 1, a typical aircraft comprises three sets of landing gear: a nose landing gear 103 (NLG); a right-hand main landing gear (RH MLG) 102; and a left-hand main landing gear (LH MLG) 101. The method of the present invention may be performed on an individual landing gear 101, 102, 103 or simultaneously across all sets of landing gear 101, 102, 103 on an aircraft.

The LGICU 104 can be located on the aircraft or form part of a ground equipment. The control unit 104 requires an electronic power supply. The inputs to the control logic 104 are received from a pilot or a maintenance crew member and a temperature sensor 106 which measures the ambient temperature around the aircraft. The outputs from the control logic 104 are electronic signals for controlling valves 108 which dictate gas flow through the shock absorbers. Feedback information from a Rotary Variable Differential Transducer (RVDT) 107 regarding shock absorber length is used in order to determine a point at which pressurization is stopped. The control unit 104 is an electronic unit comprising logic laws to define the pressurization requirements and to control gas valves 108.

Each landing gear 101, 102, 103 has a manifold, ideally located on or close to the landing gear 101, 102, 103. The manifold's main component is a valve 108 that is electronically controlled by the LGICU 104. The manifold has a Nitrogen supply 105 and a connection to the shock absorber, such that upon activation of the valve 108 by the LGICU 104, the Nitrogen supply 105 will be connected to the shock absorber and therefore pressurize it. FIG. 1 shows a simple two-way valve 108 for use in pressurizing a shock absorber. Alternatively, a three-way valve may be used such that the shock absorber may be electronically depressurized. The valve 108 may be activated electronically or manually by maintenance crew.

The high pressure Nitrogen supply 105 can come from a connection on the aircraft or a ground supply. Alternatively, a pressure bulkhead may be mounted on the airframe. In another embodiment, the landing gear 101, 102, 103 structure may be used as a pressure bulkhead to store high pressure Nitrogen 105 independently of the shock absorber. In a further embodiment, a replicable, detachable high pressure canister can be directly connected to each manifold or connected to all manifolds for simultaneous pressurization or depressurization.

RVDTs 107 installed on each landing gear 101, 102, 103 (for example, on a torque link joint for a telescopic landing gear) provide feedback for the shock absorber length based on the transducer readings and the geometric relations. Other means of measuring the shock absorber length may be used.

Pressure transducers (not shown in FIG. 1) on each landing gear 101, 102, 103 can also provide pressure reading feedback for each landing gear 101, 102, 103.

The landing gear 101, 102, 103 comprises shock absorbers which include oil held in a cylinder, and a piston. At equilibrium, the pressure of the weight of the aircraft pushing down on the shock absorber is equal to the pressure of the fluid in the shock absorber pushing upwards. Knowing this pressure and the size of the shock absorbers allows the weight of the aircraft to be calculated. The LGICU 104 control logic can be programmed to compensate for seal and bearing friction.

Due to differing weights of aircraft, and differing ambient temperatures in which aircraft are used, entering a specific amount of gas into a shock absorber does not result in the same shock absorber length. As such, for present systems, an engineer must iteratively place more gas into the shock absorber, and gradually increase the volume of gas until the shock absorber reaches a desired length.

Given that the weight of most aircraft is difficult to calculate, present systems for initializing shock absorbers employ the iterative process described above. Gas is added and removed until the desired length of the shock absorber is achieved. The exemplary embodiment of the present invention does not use this iterative process as it uses the RVDT 107 feedback in real time to define when to stop pressurizing.

In some embodiments of the present invention the weight of an aircraft is unknown. In such circumstances, the weight can be calculated by increasing the pressure inside the shock absorber until the shock absorber begins to extend in length. At this point, the pressure inside the shock absorber is at equilibrium with the weight of the aircraft. Therefore, the weight of the aircraft can be calculated, due to the relation:

$$P = \frac{F}{A}$$

where P is the pressure, F is the load and A is the known piston area of the shock absorber.

Once the weight of the aircraft is known, the next step is to measure the ambient temperature around the vehicle. The temperature can be measured using a temperature sensor 106 in communication with the LGICU 104 or, alternatively, the temperature may be received from an external input (e.g. from a separate system or by manual input). The temperature value and the weight of the aircraft are then used to determine a required length of the shock absorber which can change depending on the situation. For example, the shock absorber may be fully extended to provide better clearance for maintenance personnel, they may be fully depressurized if an aircraft is to be stored, or they may be set to an optimum length for flight.

Once the required length of the shock absorber has been calculated, a valve 108 is opened and the shock absorber is pressurized. The RVDT 107 is used to provide a real time feedback signal directly related to the length of the shock absorber. Once the LGICU 104 receives the desired signal from the RVDT 107, the valve 108 is closed.

Figure 2:
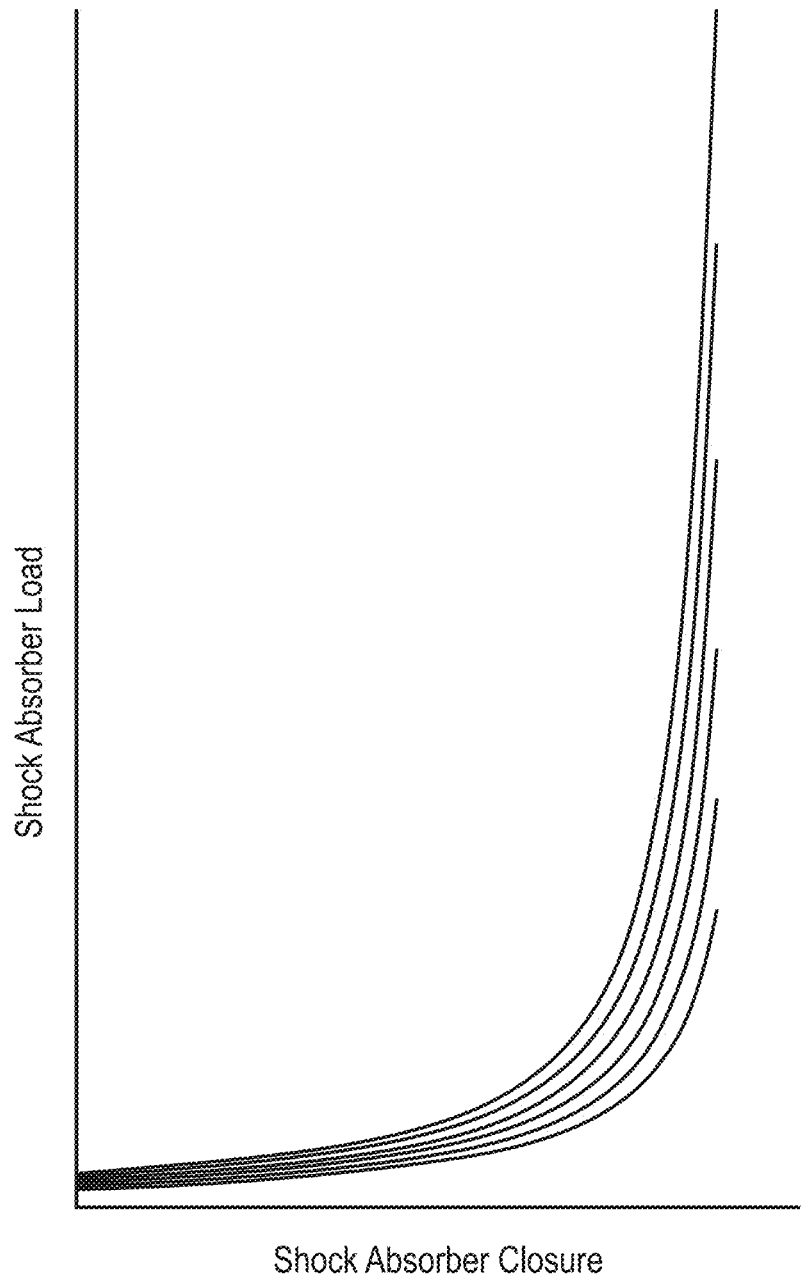
FIG. 2 shows a typical shock absorber spring curve for an aircraft landing gear.

FIG. 2 shows a typical shock absorber spring curve where the load is plotted against shock absorber closure (also known as Shock Absorber Travel (SAT)) for various temperatures. The ambient temperature around the shock absorber is used to determine which curve to use in calculating the correct length of shock absorber. Once the curve is chosen, the shock absorber length is calculated using the weight of the aircraft.

For example, for an aircraft in a storage condition with a mass of 15,000 kg, for a typical nose wheel tricycle landing gear 101, 102, 103 configuration with oleo pneumatic telescopic shock absorbers and a 10% load on the nose landing gear 103, the storage load $F_s$ for the two main landing gear 101, 102 will be: $F_{SMLG}=15000\times9.81\times0.45=66.2$ kN; and for the nose landing gear 103 it will be $F_{SNLG}=15000\times9.81\times0.1=14.7$ kN.

If the outside temperature is measured at 48° C., the LGICU 104 logic will select the closest appropriate temperature curve, e.g. a 50° C. curve, that will define the required SAT for an ambient temperature of 48° C. The LGICU will then send the command to pressurize the landing gear 101, 102, 103 until the RVDT 107 reading matches the SAT requirement defined by the loads calculated above. Alternatively, the LGICU 104 may calculate a new spring curve based on the ambient temperature.

Alternatively, there are several intermediate embodiments which would be clear to the skilled person. For example, manual pressurization by an engineer using an internal gas canister, manual calculation of the target pressure with automatic pressurization, or automatic calculation of the target pressure but requiring manual pressurization.

It is to be appreciated that the specific method described above is that of an exemplary embodiment, and that these steps may be implemented in alternative manners and orders, depending on the specific system.

The invention claimed is:

1. A method of pressurising or depressurising an aircraft shock absorber, the method comprising:
    determining the weight of the aircraft based upon an internal pressure of the aircraft shock absorber;
    measuring an ambient temperature around the shock absorber;
    calculating a target length of the shock absorber based on the ambient temperature and the determined weight of the aircraft; and
    pressurising or depressurising the shock absorber to the target length.

2. The method according to claim 1, wherein the target length is a shock absorber maintenance length, a flight length or a storage length.

3. The method according to claim 1, wherein the length of the shock absorber is measured using a Rotary Variable Differential Transducer.

4. The method according to claim 1, wherein the shock absorber is pressurised using Nitrogen gas.

5. The method according to claim 1, wherein the method is performed on at least two shock absorbers simultaneously.

6. The method according to claim 1, wherein the step of determining the weight of the aircraft comprises increasing the internal pressure from a state where increasing the internal pressure does not extend a length of the shock absorber.

7. A system for pressurising or depressurising a shock absorber of an aircraft, the system comprising:
   pressurisation means, in fluid connection with the shock absorber;
   a temperature sensor, arranged to measure an ambient temperature around the system; and
   control logic, arranged to control the pressurisation means,
   wherein the control logic comprises a processor arranged to:
      determine the weight of the aircraft based upon an internal pressure of the aircraft shock absorber;
      receive an ambient temperature measurement from the temperature sensor;
      calculate a target shock absorber length based on the temperature measurement and the determined weight of the aircraft; and
      instruct the pressurisation means to pressurise or depressurise the shock absorber to the target length.

8. The system according to claim 7, wherein the target shock absorber length is a shock absorber maintenance length, a flight length or a storage length.

9. The system according to claim 7, wherein the length of the shock absorber is measured using a Rotary Variable Differential Transducer.

10. The system according to claim 7, wherein the shock absorber is pressurised using Nitrogen gas.

11. The system according to claim 7, wherein instructing the pressurisation means to pressurise comprises increasing the internal pressure from a state where increasing the internal pressure does not extend a length of the shock absorber.

12. The system according to claim 7, wherein measuring the internal pressure comprises measuring the internal pressure when the internal pressure is at equilibrium with the weight of the aircraft.

* * * * *